Nov. 22, 1966     A. P. CLOUTIER     3,286,282
BEDSTEAD FASTENING
Filed Oct. 21, 1964     4 Sheets-Sheet 1
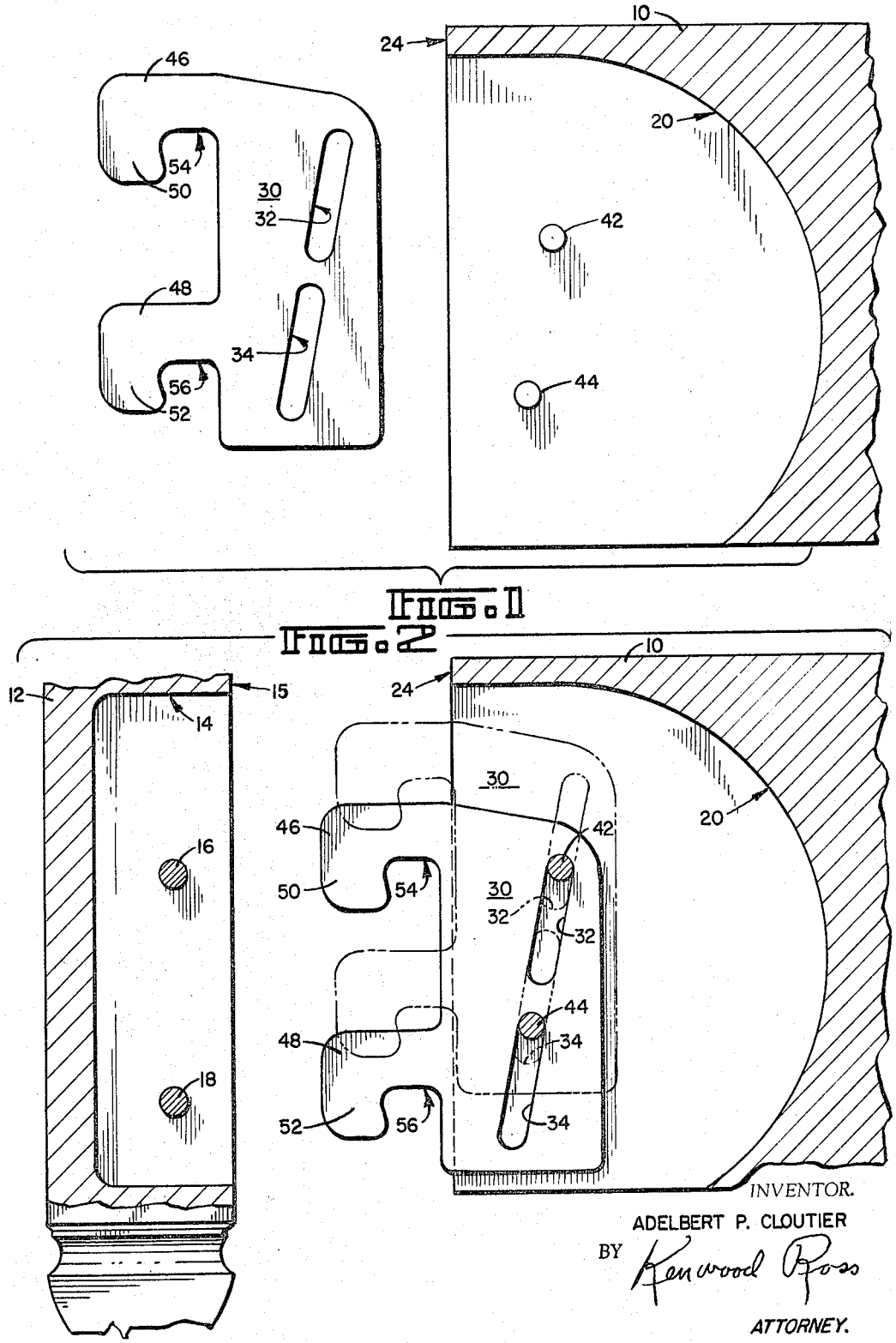
INVENTOR.
ADELBERT P. CLOUTIER
BY Kenwood Ross
ATTORNEY.

Nov. 22, 1966 — A. P. CLOUTIER — 3,286,282
BEDSTEAD FASTENING
Filed Oct. 21, 1964 — 4 Sheets-Sheet 2

INVENTOR.
ADELBERT P. CLOUTIER
BY Kenwood Roso
ATTORNEY.

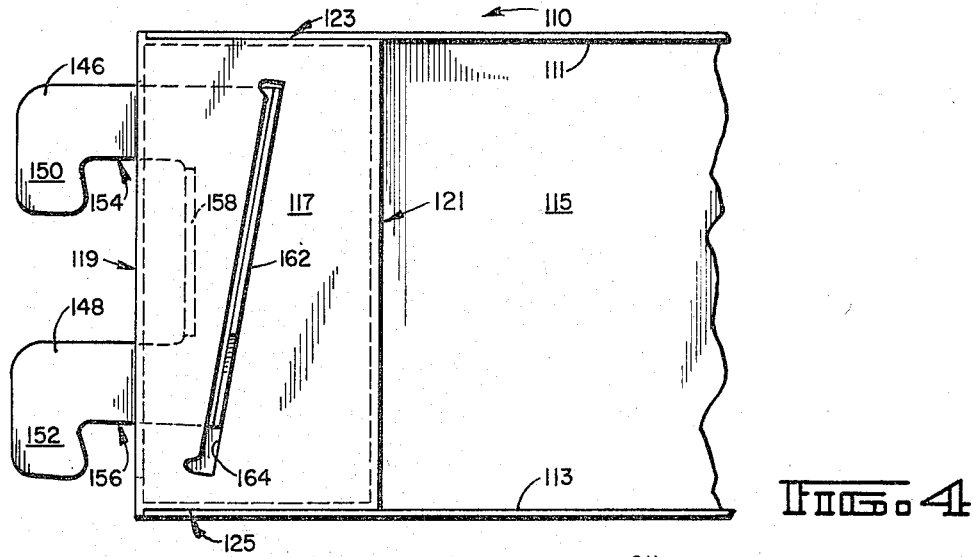
FIG. 4
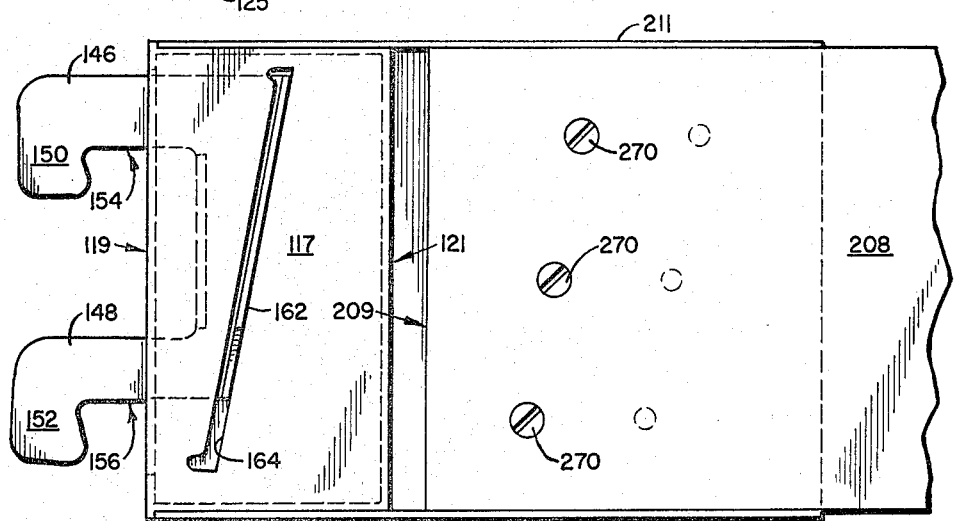
FIG. 5
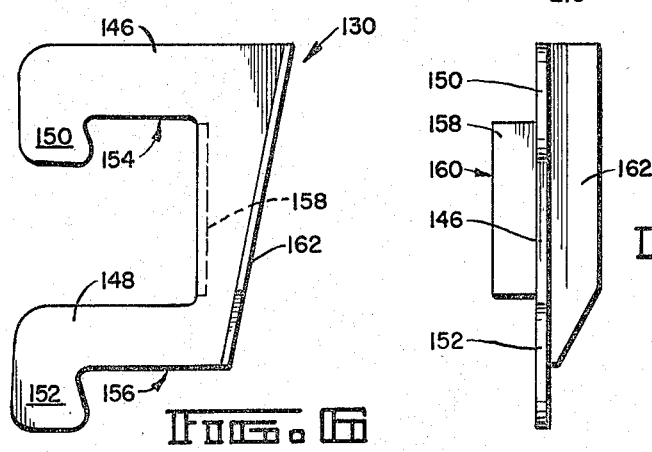
FIG. 6
FIG. 7
INVENTOR.
ADELBERT P. CLOUTIER
BY Kenwood Ross
ATTORNEY.

Nov. 22, 1966 A. P. CLOUTIER 3,286,282
BEDSTEAD FASTENING
Filed Oct. 21, 1964 4 Sheets-Sheet 4
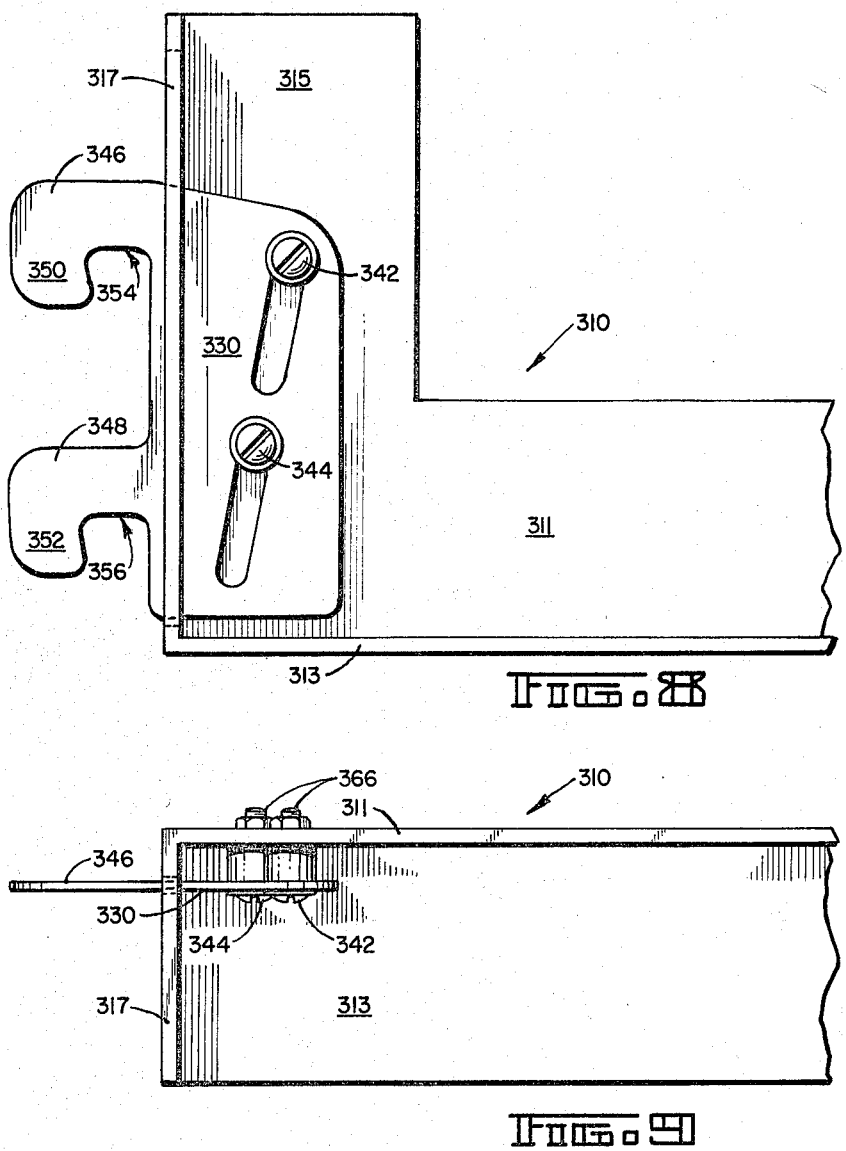
INVENTOR.
ADELBERT P. CLOUTIER
BY Kenwood Ross
ATTORNEY.

United States Patent Office 3,286,282
Patented Nov. 22, 1966

3,286,282
BEDSTEAD FASTENING
Adelbert P. Cloutier, 22–24 N. Main St., Orange, Mass.
Filed Oct. 21, 1964, Ser. No. 405,504
1 Claim. (Cl. 5—296)

The present invention relates generally to new and useful improvements and structural refinements in fastening means for holding stationarily one construction or component relative to another and has applications in situations where one of the constructions or components may be of metal and the other may be of wood, or where both may be of metal, or where both may be of wood.

The invention is directed more particularly to the provision of means which comprehends devices useful in static building or article structures or the like where the principal elemental materials are of wood or metal, exploiting the use of interfitted constructions or components where one thereof is the load-bearing construction or component in the respect that it is sufficiently strong and rigid to act as the primary support for other constructions or components against gravity or to resist transverse loading such as in the case of sustainers or rigid constructions or components (e.g. studs, joists, beams or columns) having a limited closed periphery which, is greatly elongated relative to any lateral dimension, resists transverse loading, and supports other constructions or components.

Without intending to place undue limitations upon the scope of the invention beyond what may be required by the state of the prior art, the particular embodiment may be briefly described as embracing the concept of an interlocking system for the fastening of one member, of wood or metal or the like, to another member, of wood or metal or the like.

It will be apparent, however, that the physical embodiments delineated, i.e. bed constructions where rails and posts thereof may be interlocked, albeit the preferred exemplifications, are only indicative of but several of the multiplicity of ways and purposes for which the broad principles of the invention may be employed. Same are submitted as best known embodiments for the practical use of the invention, in accordance with the patent statutes, and are given with a view to illustrating and explaining the precise nature of the principles of the invention, in order that others skilled in any of the arts to which the invention may reasonably pertain may be enabled to adapt and modify them in numerous variations and modifications, each as may be best adapted to the conditions of any particular use.

Accordingly, one purpose of the invention may be defined to teach improved fastening means and more particularly an improved furniture fastener by means of which a side rail of a bed may be retained in engagement with a head and/or foot of a bed.

In wooden bends, now in common use, the side rail is latched to the corner post by hook members on the side rail engaging transverse pins set into the post. It has been found, however, that after the bed has been used for a short time the hook members, and the pins over which they engage, wear to some extent so that finally the bed becomes unsteady because of a resultant loose, creaky interconnection between rail and post. This arrangement has been found further unsatisfactory as the hook members may become tightly wedged between the cross pins and inner ends of the slots and wherefore they become difficult to release.

The prior art constructions are singularized by the fact that the fastener devices assume fixed positions upon the rails wherewith, when applied to fixed points on the adjacent posts, connections therebetween are allowed which are on the bias in the sense that as pressure is applied to the rail, the fastening devices exhibit tendencies to become loose if not to become disengaged altogether.

Contrariwise, it is the teaching of this invention to provide an ever-tightening relationship between the components as the pressures normal to article usage are experienced, and further to provide a mechanism which floats in the respect that it has a capacity to adjust itself according to wear or shrinkage.

Therefore, one object of the invention is to provide a bed rail fastener which may have portions engaged with cross pins passing through a bed post slot and securely held in engagement therewith but permitted to be easily released therefrom.

It is another object hereof to provide means for maintaining a tight connection between rail and post even after wear has occurred.

Another object of the invention is to provide a fastener means with a body portion adapted to be secured to a bed rail and carrying arms for engaging the cross pins of a bed post, means being provided to securely but releasably retain the arms in a set position.

A further object of the invention is to guide movement of the cross pin-engaging arms so that they may be easily engaged with or disconnected from the cross pins carried by the bed posts.

Still another object is to provide a fastener of the character described which may be formed from stamped sheet metal so as to be strong and durable and, at the same time, economical to produce.

Yet another object is to provide a fastener adapted to be secured relative to a bed rail that it will be out of the way and hidden from view so as not to detract from the appearance of a bed.

Another object of the invention is to provide a bed rail fastener including a pair of anchors which are slidably mounted for unison movement into and out of an operative position and permitted to have a sliding movement until they are properly engaged with cross pins carried by the head or foot of a bed and then simultaneously drawn upon until the bed rail is firmly secured to the companion head or foot.

Another object of the invention is to provide a fastener of this general character which will not be liable to slip after a bed rail has been secured and serve to very firmly secure the bed rail but at the same time permit it to be easily released when and as necessary.

These foregoing objects and other incidental ends and advantages will in part be obvious and apparent and will in part be more fully pointed out as the nature of the invention is better understood in the progress of the disclosure below. To the end of attaining these objects and advantages and others hereinafter reasonably appearing, it will be explained that the invention consists substantially in the combination, construction, configuration, location and function of parts, as herein described in detail.

The invention reverted to is not restricted or confined to said embodiments and same are not intended to be exhaustive of, nor limiting of, the spirit or scope hereof. That is, the precise construction of the figures of the drawings need not be slavishly followed as, of course, the fastening means may have to be adapted or alternatively constructed or modified in accordance with any specific use contemplated therefor, there being no intent to have this invention limited to or circumscribed by any specific details. Such adaptions and/or alternative constructions and/or modifications are intended to be comprehended within the meaning and purview and range of equivalence of the below subjoined claims.

The objects of the invention are susceptible of attainment by use of constructions different in certain respects from that disclosed, such as minor changes and variations in dimensions, shape, form, proportion, integration, cooperation of material and/or type of subassembly and accessory, all without departing from the underlying principles, salient features, scope and spirit hereof.

The characteristic features which I consider to be novel with my invention, as to its construction and organization, will be better understood from a consideration of the following detailed description forming a part of this specification, when read in conjunction with the illustrations in the accompanying drawings in which:

FIG. 1 is an exploded view, in side elevation, showing a latching plate and a side rail in non-interrelated position, with the side rail being shown in vertical section;

FIG. 2 is an exploded view in vertical section, showing a latching plate with its interconnected side rail and a corner post of a bed in a non-interrelated position, and further showing the latching plate in the position it assumes relative to the side rail in its unlocked position (in solid lines) and in its locked position (in dash lines);

FIG. 4 is a view, in side elevation, of a modified form of construction employing the basic principles of the invention;

FIG. 5 is a view, in side elevation, of another modified form of construction employing the basic principles of the invention;

FIG. 6 is a view, in side elevation, of the latching plate shown in FIGS. 4 and 5;

FIG. 7 is a view, in end elevation, of the latching plate shown in FIGS. 4 and 5;

FIG. 8 is a view, in side elevation, of another modified form of construction employing the basic principles of the invention; and FIG. 9 is a view, in top plan, of the modified form of the invention shown in FIG. 8.

Figure 3:
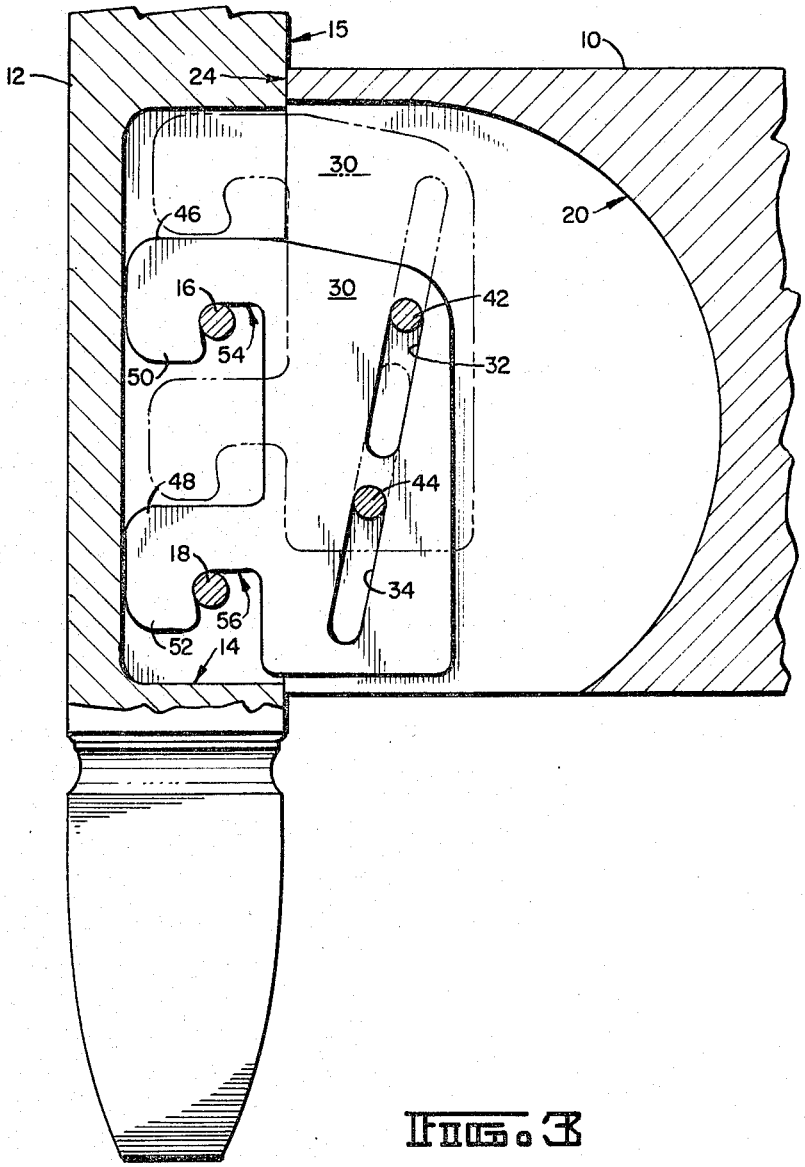
FIG. 3 is a view, in vertical section, showing the latching plate and side rail combination interrelated with a corner post and further showing the latching plate in its unlocked position (in solid lines) prior to operative engagement with the cross pins carried by a head or foot corner post of the bed and in its locked position (in dash lines) following operative engagement with the cross pins.

In the following description and appended claim, various components and details thereof will be identified by specific names for purposes of convenience. Although specific terms and expressions are employed for purposes of identifying various components, they are used in a generic and descriptive sense only. The phraseology or terminology herein employed is not for the purpose of limitation; the phrases and terms are intended to be as generic in their application as the art will permit. They are not intended to exclude any reasonable equivalents of the features shown and described or portions thereof. For example, while reference to a bed has been used in the specification, it will be understood that the invention is conceived as applicable for use with any wood to wood, or wood to metal, or metal to wood arrangement, all without material alteration in its structural features.

With continued reference now to the drawings, which illustrate typical and preferred embodiments of the invention for purposes of disclosure, I have shown applications involving bed components wherewith the devices may be advantageously incorporated in order that the general relation and utility of the system may be better understood.

The improved fastener constituting the subject matter of this invention is employed to securely but releasably connect the rail 10 with the corner post 12 of a head or foot of a bed, the corner post being provided with the usual recess or pocket or mortise chamber 14 extending inwardly from one side face 15 thereof in the nature of a slot through which extends in transverse intersecting manner upper and lower cross pins 16 and 18 respectively having opposite ends receivable in suitably aligned openings in the corner post.

It will thus be seen that the fastener may be applied to a bed having side rails and a head and foot of conventional construction.

In the embodiment of the invention shown in FIGS. 1–3, side rail 10 is shown fragmentarily, with only the latching end thereof being illustrated, in order to explain its relationship to a latching plate 30.

The side rail is constructed in the usual manner and is provided with an arcuate slot or recess 20 formed therein to extend inwardly from its end face 24 and intermediate its inboard and outboard side faces, which recess is of a width sufficient loosely to receive the main body portion of latching plate 30 therein.

Latching plate 30, formed of metal, is mounted within the arcuate slot 20 and is adapted for a certain slidable movement therewithin, as will appear.

The main body portion of the latching plate is provided with a pair of aligned, slightly inclined, upper and lower slots 32 and 34 respectively for receiving therethrough a pair of upper and lower slip pins 42 and 44 respectively which extend in transverse intersecting manner through the arcuate slot and have opposite ends receivable in suitably aligned openings in the side rail portions at opposite sides of the arcuate slot.

Due to the angular disposition of slots 32 and 34 along an inclined plane, they provide cam surfaces wherewith the latching plate may be moved vertically relative to the side rail from what is defined as a normal position of rest or unlocked position shown in solid line in FIG. 2 wherein the latching plate is disposed in its lowermost position with the walls at the top of the slots 32 and 34 bearing upon the slip pins 42 and 44 respectively to what is defined as a position of elevation or ready-to-lock position shown in dash line in FIG. 2 wherein the latching plate has been cammed upwardly relative to the slip pins with the slip pins now located intermediate the opposite extremities of their respective slots.

It is to be stressed, in this connection, that, as the latching plate is motivated upwardly, as above set forth, the outboard end face of the main body portion of the latching plate is moved accordingly from a position where its plane is outboard of and parallel with the vertical plane of the end face 24 of the side rail to a position where its plane is in alignment with the said vertical plane of the end face or inboard of and parallel with the said vertical plane of the end face depending upon the precise positioning of the slip pins inwardly of the end face.

The outboard end of the latching plate is provided with a pair of unitary outwardly-extending upper and lower anchor arms or fingers 46 and 48 respectively having outer ends formed with upper and lower downwardly facing hooks 50 and 52 respectively to define upwardly-extending upper and lower slots 54 and 56 respectively for receiving the respective cross pins 16 and 18 in the corner post when the anchor arms or fingers are extended into recess or pocket 14 upwardly of or above the respective cross pins, the recess or pocket 14 being of such height and the cross pins being so spaced as to each other as to allow a clearance upwardly of each cross pin sufficient to allow the extension of the anchor arms or fingers fully into the pocket and without contact of the cross pins by the respective hooks 50 and 52. That is, the hooks are allowed to be extended inwardly of or beyond the vertical plane defined by the cross pins in manner whereby the latching plate may be allowed to drop or slide downwardly responsive to the camming action of the slip pins so that the hooks accordingly are passed downwardly each below the horizontal plane of its respective cross pin and the cross pins seat in the respective upper and lower slots 54 and 56.

In this manner, horizontal, vertical and angular movement of the latching plate is found to be allowed.

As will be appreciated by reference to FIG. 3, the side rail, with the latching plate in the normal position of rest or unlocked position, is brought to the corner post with the side rail-latching plate assemblage being raised or elevated in a horizontal plane so as to permit the introduction of the anchor arms into the recess 14 upwardly of or above the respective cross pins sufficiently so as to deny confrontation of the respective hooks with the cross pins whereby the end face of the side rail may be brought into juxtaposition with the side face of the corner post. So positioned, the side rail may then be caused to be lowered wherefore the hooks will drop down relative to their respective cross pins until the cross pins seat in the respective upper and lower slots 54 and 56.

As the side rail is so lowered vertically, a vertical upward movement is imparted to the latching plate within the limits of the slip pins.

In actuality, the slots 32 and 34 are intentionally of such length that the latching plate under normal conditions of assembly does not move upwardly to that extreme upper position where the slip pins seat in the bottoms of their respective slots so as to preclude further upward movement and this for the reason that the slots are purposefully dimensioned so that the length of plate travel is never such as to exploit the full length of the slots so as to provide a compensating distance representative of an allowance factor to provide for additional upward movement of the latching plate, following assembly, when and as wear and/or shrinkage and/or other ageing conditions ensue through continued use. Advantageously, the cam surfaces tend to wedge the latching plate and the side rail to the left as shown in FIG. 3, thereby tending to tighten the corner post-side rail relationship with a capability for continued wedging when and as any shrinkage of parts, corner post or side rail, develops.

Upon an inspection of FIGURES 1–3, it will be readily seen that when it is desired to connect a bed rail with a corner post of a head or foot of a bed, the anchor arms or fingers are passed into the pocket 14 and engaged with the pins 16 and 18 as by grappling or hooking thereonto, and in doing so, a pulling action is exerted against the latching plate and the rail so the anchors will be drawn downwardly. This causes the bed rail to be drawn firmly against the corner post of the head or foot of the bed. Since the latching plate slots 32 and 34 enjoy a slight looseness with respect to the slip pins, a slight pivoting of the latching plate relative to the rail is allowed and concomitantly the anchors are permitting to move until they properly engage the pins 16 and 18 and then move unisonly to draw the bed rail into tight binding engagement with the corner post 12. In order to release the bed rail, it is merely necessary to disengage the anchors from the pins by pressing vertically upwardly against the lower planar surface of the rail until the hooks are swung upwardly as indicated by dotted lines in FIGURE 2 and a pulling action exerted to draw the anchors out of the pocket, the essential point being that the normal forces or thrusts experienced by the rail including the forces of gravity are vertically downward forces against the upper planar surface of the rail so as desirably to offer an ever tightening reaction.

As has been indicated above, the device is not limited to bedsteads and may find applications in tables, shelving or the like where it may be desired to eliminate the conventional mortising problems so as to allow locking without glue.

Additionally, it is entirely conceivable that permanent securement may be desired in which event the same mechanism may be employed with the addition of gear washers or other components offering serrated edges and sleeved upon the slip pins where the hardness of the washers against the latching plate of a lesser temper will allow a biting action between washer and plate.

To avoid needless repetitious description, similar characters of reference have been applied to the corresponding parts in the illustrations of the other forms of the invention now to be described and new reference characters are applied only where significant departures take place.

In the modified form of the invention shown in FIG. 4, an all metal subassembly of side rail and latching plate is shown.

In this case, the side rail, generally indicated by 110, is shown as being of metal defining the normal channel shaped construction in cross section comprising upper and lower horizontally disposed flanges 111 and 113 respectively interconnected by a vertically disposed web 115.

Within the area defined by the flanges 111 and 113 a box-like arrangement may be nestably received inclusive of a so-called bottom wall 117 held in spaced parallel relationship to web 115 by a pair of spaced end walls 119 and 121 and a pair of spaced side walls 123 and 125 unitary with and disposed in right-angular relationship to bottom wall 117.

A latching plate 130, best shown in FIG. 6, corresponds essentially in design and function with the latching plate 30 of the form of FIGS. 1–3 and includes the upper and lower anchor arms or fingers 146 and 148 respectively and the upper and lower hooks 150 and 152 respectively and the upper and lower slots 154 and 156 respectively, differing therefrom only in the first respect that the outboard end face of its main body portion is provided with a down turned primary guide 158 unitary with or separate from and extending from and in right angular relation to the main body portion, the outermost vertically extending end face 160 of which guide serves on assembly as a bearing surface for bearing upon the adjacent face of web 115 as the anchor arms or fingers are extended outwardly of the box-like arrangement through a suitable slot in end wall 119 and in the second respect that the inboard end face of its main body portion is disposed at an angle relative to the main vertical axis of the latching plate and is provided with an upturned secondary guide 162 unitary with or separate from and extending from and in right angular relation to the main body portion, which guide 162 is receivable through a complementary inclined slot 164 in the bottom wall 117, wherewith the camming and wedging features of the structure of FIGS. 1–3 are obtained. Primary guide 158 and secondary guide 162 may be unitary, if desired.

In the modified form of the invention shown in FIG. 5, the construction shown in FIG. 4 is disclosed as being adapted for attachment to a wooden rail 208 for service as an extension mechanism additionally to a fastening mechanism.

In this case, a metal channel shaped extension member comprises upper and lower horizontally disposed flanges 211 and 213 respectively interconnected by a vertically disposed web 215, with the outboard extremity of wooden rail 208 being nestably receivable within the flanges 211 and 213 and being stationarily secured to the web 215 as by suitable bolting 270, all wherewith the fastening assembly may be positioned outboard of the end face 209 of the wooden rail 208 so as to extend the operating length of said wooden rail.

In the modified form of the invention shown in FIGS. 8 and 9, an all metal assembly of side rail and latching plate is shown.

In this case, the side rail, generally indicated by 310, is shown as being of metal defining the normal angle shape in cross section comprising a vertically extending web 311 and a horizontally extending web 313 unitary with and in right angular relationship thereto, with the outboard end portion of the rail being upturned in right angular relation to its main horizontal axis to provide a vertically-extending side web 315 and a vertically extending end web 317.

A latching plate 330 corresponds essentially in design and function with the latching plate 30 of the form of FIGS. 1–3 and includes the upper and lower anchor arms or fingers 346 and 348 respectively and the upper and lower hooks 350 and 352 respectively and the upper and lower slots 354 and 356 respectively, differing therefrom only in the first respect that the slip pins 342 and 344 are secured as by suitable bolting 366 to the side web 315 upon which slip pins, washers or other spacer means 368 may be provided so as to hold latching plate 330 distantly of and in coplanar relationship with web 311, the end web 317 being provided with a suitable slot through which the anchor fingers or arms of the latching plate may extend.

It is believed that the gist of the invention will be clearly understood from the foregoing disclosure and accordingly, further analysis thereof at this point is considered unnecessary, as I have, in accordance with the provisions of the patent statutes, described the construction and principle of operation of my invention together with the apparatus which I believe to represent the best embodiment thereof, to the end that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are reasonably contemplated, the invention being susceptible of such without departing from its real spirit or underlying principles.

The protection which is sought for this invention is covered by the language of the above specification and the spirit represented thereby. It should be appreciated that its utility and application extend beyond the particular type of construction illustrated and its broad scope and concept comprehend the useful and novel features set forth when combined with any reasonable constructions when metal is joined to metal or to wood or where wood is joined to wood or to metal.

The claim is desired to include within the scope thereof all of said suitable variations, modifications and equivalents by which substantially the results of the invention may be obtained through the use of substantially the same or equivalent devices or means. Accordingly, limitation hereof should only be made as determined by a proper interpretation of the prior art and the scope of the subjoined claim, in which it is my intention to claim all novelty inherent herein as broadly as possible.

I therefore particularly point out and distinctly claim as my invention:

In fastening means for interengaging the adjacent working faces of steel to steel or steel to wood or wood to steel or wood to wood components, the combination of, a pair of spaced vertically-offset slip pins extending transversely across a vertical recess extending inwardly from the working face of one of the components, a unitary latching plate having a pair of spaced angularly-aligned and inclined slots for receiving the respective of said slip pins as said latching plate is positioned in slidably mounted connection with the said one of the components and having a pair of hooks formed rigidly upon said latching plate and disposed outboard of the vertical plane of the working face of the said one of the components and hooking back toward said vertical plane, a pair of spaced vertically-aligned cross pins extending across a vertical recess extending inwardly from the working face of the other of said components, and adapted each for interengagement with the respective of the hooks of said latching plate as the hooks of said latching plate are extended into mating position within the recess of the said other component.

References Cited by the Examiner
UNITED STATES PATENTS

| | | | |
|---|---|---|---|
| 1,871,199 | 8/1932 | Rainier | 5—296 |
| 2,246,090 | 6/1941 | Filer | 5—296 |
| 2,420,095 | 5/1947 | Rainier | 5—296 |
| 3,161,894 | 12/1964 | Short | 5—296 |

FRANK B. SHERRY, *Primary Examiner.*

R. D. KRAUS, *Assistant Examiner.*